(12) United States Patent
Shutt et al.

(10) Patent No.: US 6,764,602 B2
(45) Date of Patent: Jul. 20, 2004

(54) PROCESS OF REMOVING OXYGENATED CONTAMINANTS FROM AN OLEFIN COMPOSITION

(75) Inventors: John Richard Shutt, Tervuren (BE); Keith H. Kuechler, Friendswood, TX (US); William A. Weber, Burlington, NJ (US)

(73) Assignee: ExxonMobil Chemical Patents Inc., Houston, TX (US)

(*) Notice: Subject to any disclaimer, the term of this patent is extended or adjusted under 35 U.S.C. 154(b) by 302 days.

(21) Appl. No.: 09/997,436

(22) Filed: Nov. 29, 2001

(65) Prior Publication Data

US 2003/0098281 A1 May 29, 2003

(51) Int. Cl.[7] .............................. B01D 15/00; C07C 7/11
(52) U.S. Cl. ....................................... 210/663; 585/809
(58) Field of Search .......................... 210/663; 585/638, 585/640, 809

(56) References Cited

U.S. PATENT DOCUMENTS

| | | | |
|---|---|---|---|
| 2,781,863 A | 2/1957 | Bloch et al. ................. | 183/115 |
| 3,267,028 A | 8/1966 | McHarg ....................... | 208/341 |
| 4,218,569 A * | 8/1980 | Chase et al. ................. | 568/697 |
| 4,499,327 A | 2/1985 | Kaiser ......................... | 585/640 |
| 4,513,156 A | 4/1985 | Tabak ........................... | 585/329 |
| 4,864,071 A | 9/1989 | Hirai et al. .................. | 585/829 |
| 6,037,516 A | 3/2000 | Morford et al. ............ | 585/836 |
| 6,121,504 A | 9/2000 | Kuechler et al. ........... | 585/640 |
| 6,124,517 A | 9/2000 | Kaminsky et al. .......... | 585/829 |
| 6,403,854 B1 * | 6/2002 | Miller et al. ................. | 585/638 |

FOREIGN PATENT DOCUMENTS

| | | | |
|---|---|---|---|
| DE | 2155901 | 5/1973 | ............. C07C/7/00 |
| WO | WO 93/24431 | 12/1993 | ........... C07C/11/02 |

OTHER PUBLICATIONS

"Zeolites for Cleaner Technologies," Scientific Programme Lecture Notes, Pre–Conference School Poitiers Jul. 4–8, 2001.

Eng, C.N., et al, "UOP/HYDRO MTO Applications Opportunities for the Methanol to Olefins Process," Presented at Asian Olefins and Derivatives Conference, Asian Chemical New/Dewitt, Singapore, Jun. 18–19, 1999(?).

Vora, B.V., et al, "Conversion of Natural Gas to Ethylene and Propylene: UOP/HYDRO MTO Process," Proceedings Second Int. Pet. Conf. & Exbn. PETROTECH–97, New Delhi, pp. 173–186.

Eng, C.N., et al "Integration of UOP/HYDRO MTO Process into Ethylene Plants," 10th Ethylene Producers' Conference, 1998, pp. 56–85.

"Petrochemical Processes 2001," Hydrocarbon Processing, Mar. 2001, p. 114.

Vora, B.V., et al, "Production of Light Olefins from Natural Gas," 2001 Elsevier Science B.V.

\* cited by examiner

Primary Examiner—Robert A. Hopkins
(74) Attorney, Agent, or Firm—Jaimes Sher

(57) ABSTRACT

Disclosed is a method of controlling water and/or oxygenate concentrations of an olefin stream. The method includes contacting the olefin stream with a liquid absorbent. The liquid absorbent is selected from the group consisting of a polyol, amine, amide, nitrile, heterocyclic nitrogen containing compound, and mixtures thereof.

32 Claims, 1 Drawing Sheet

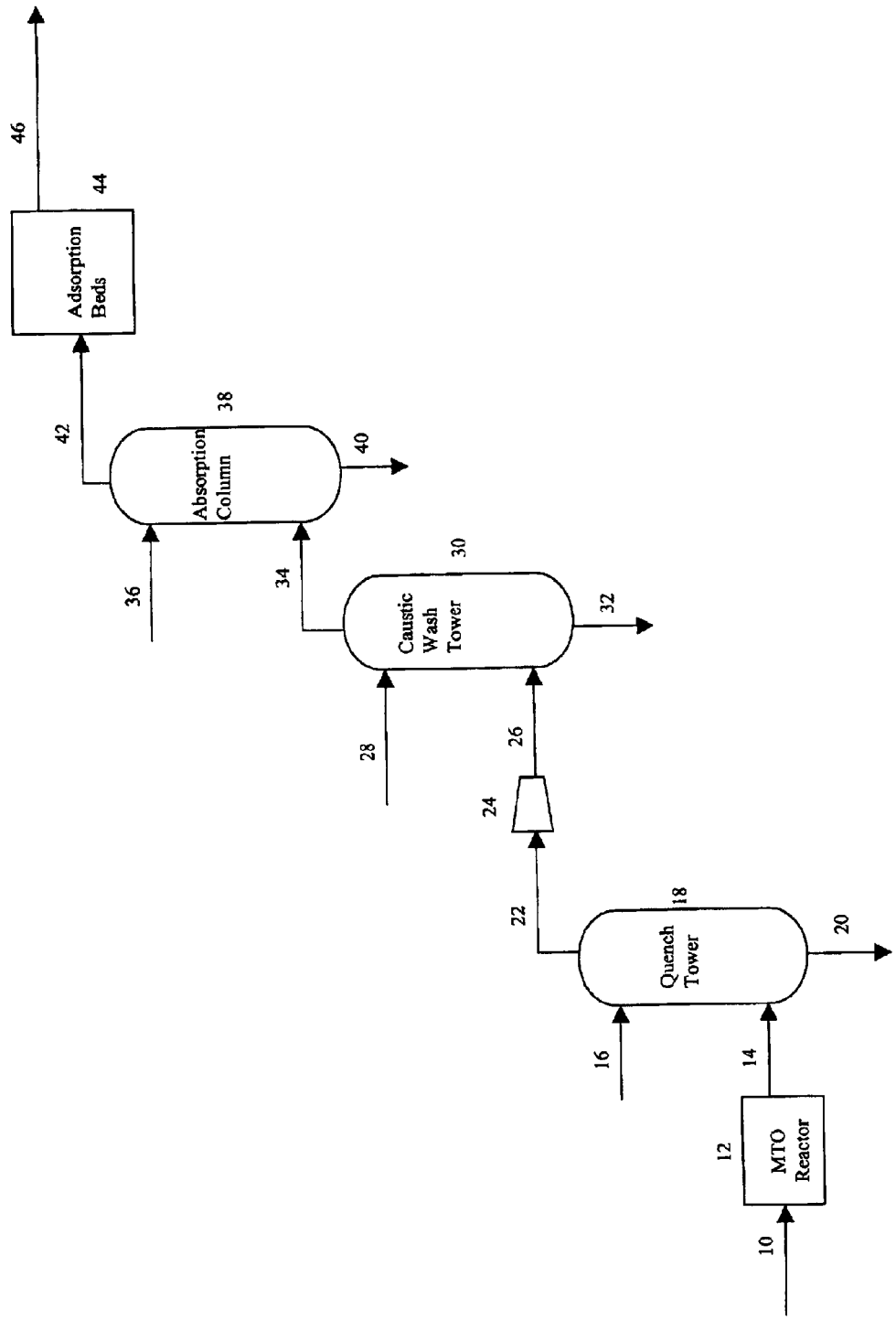
Figure

PROCESS OF REMOVING OXYGENATED CONTAMINANTS FROM AN OLEFIN COMPOSITION Field of Invention This invention relates to removing contaminants from an olefin stream. In particular, this invention is to a method of removing water and/or oxygenated hydrocarbons from an olefin stream.

BACKGROUND OF THE INVENTION

Olefins, particularly $C_2$ and $C_3$ olefins, are desirable as a feed source for making derivative products such as oligomers, e.g., higher olefins, and polymers such as polyethylene and polypropylene. Olefin feed sources have traditionally been produced by cracking petroleum feedstocks.

Oxygenates, however, are becoming an alternative feedstock for making olefins, particularly large quantities of ethylene and propylene for the production of higher olefins and plastic materials. In general, the olefins are formed by contacting the oxygenate components with a molecular sieve catalyst to catalytically convert the oxygenates to olefins.

For example, U.S. Pat. No. 4,499,327, discloses a process for making olefins from methanol using any of a variety of silicoaluminophosphate (SAPO) molecular sieve catalysts. The process is carried out at a temperature between 300° C. and 500° C., a pressure between 0.1 atmosphere to 100 atmospheres, and a weight hourly space velocity (WHSV) of between 0.1 and 40 $hr^{-1}$. The process is highly selective for making ethylene and propylene.

U.S. Pat. No. 6,121,504 also discloses a method of making olefin product from oxygenate feed using molecular sieve catalysts. Water and other unwanted by-products are removed from the olefin product by contacting with a quench medium. After contacting with the quench medium, a light product fraction is obtained which comprises the desired olefins, but also includes dimethylether, methane, CO, $CO_2$, ethane, propane, and other minor components such as water and unreacted oxygenate feedstock.

In order to further process olefins made from oxygenates, it is often necessary to reduce or remove the amount of oxygenated hydrocarbon by-products that are present in the recovered olefin product. This is because derivative manufacturing processes may use catalysts that are quite sensitive to the presence of oxygenated hydrocarbons. For example, oxygenated hydrocarbon components such as dimethylether and acetaldehyde have been found to act as poisons to certain higher olefin forming catalysts and polyolefin forming catalysts. Therefore, it is desirable to find efficient methods for removing oxygenated hydrocarbons from olefin streams which are predominantly comprised of ethylene and/or propylene.

U.S. Pat. No. 4,864,071 discloses a process for separating an unsaturated hydrocarbon from a gas mixture. The unsaturated hydrocarbons are produced by pyrolysis of saturated hydrocarbons such as petroleum fractions. The process includes contacting the gas mixture with a solid adsorbent made from a silver or copper halide and polystyrene.

U.S. Pat. No. 6,037,516 discloses a method for removing oxygenate impurities such as formaldehyde, acetaldehyde, propionaldehyde, and methyl formate from a propylene stream, which is a by-product stream of an alkylene oxide manufacturing process. The method of removing the impurities includes treating the propylene stream sequentially with aqueous sodium bisulfite and aqueous sodium hydroxide, accompanied by separation of the oxygenate impurity reaction products using coalescers.

U.S. Pat. No. 6,124,517 discloses a method for purifying olefins produced by thermal cracking of hydrocarbon feedstocks. The method uses heterogeneous adsorbents to remove acetylenic impurities and saturated hydrocarbon gases. The adsorbents comprise a metal supported on a high surface area carrier.

U.S. Pat. No. 4,513,156 discloses a method of removing oxygenated hydrocarbons from olefinic feedstocks produced from Fischer-Tropsch conversion of synthesis gas. The method uses water as an adsorbent, and is particularly useful where the olefinic feed is rich in $C_3+$ mono-olefins and contains a minor amount Of $C_2-C_6$ oxygenates, and the olefin feed is used for the manufacture of higher olefins.

Additional methods are sought for removing oxygenated hydrocarbon, as well as water, contaminants from olefin streams. In particular, more desirable methods are sought for removing water and/or oxygenated hydrocarbons from ethylene and/or propylene containing streams, particularly such streams made from an oxygenate to olefin reaction process.

SUMMARY OF THE INVENTION

This invention provides an effective method for removing oxygen containing compounds such as water and/or oxygenated hydrocarbons from olefin streams. The method is particularly effective in removing water and/or oxygenated hydrocarbons from olefin streams produced in oxygenate to olefin reaction processes.

In one embodiment, the method of removing water and/or oxygenated hydrocarbons from an olefin stream comprises contacting an oxygenate with an olefin forming catalyst to form an olefin stream, wherein the olefin stream comprises olefin and oxygenated hydrocarbon. The olefin stream is then contacted with an absorbent in an absorption system to absorb the water and/or oxygenated hydrocarbon from the olefin stream, wherein the absorbent is selected from the group consisting of a polyol, amine, amide, nitrile, heterocyclic nitrogen containing compound, and mixtures thereof.

In another embodiment, the method includes removing an olefin stream from the absorption system. In yet another embodiment, the olefin stream removed from the absorption system contains at least 50 wt % less water and/or oxygenated hydrocarbon than the olefin stream formed by contacting the oxygenate with the catalyst.

Additional water and/or oxygenated hydrocarbon is removed in embodiments of the invention which include an adsorbent system. In these embodiments, an olefin product stream is formed which contains not greater than 1 wppm water.

In another embodiment of the invention, water and/or oxygenated hydrocarbons are removed from an olefin stream containing at least 50 wt % ethylene and propylene, not greater than 20 wt % water, and not greater than 15 wt % oxygenated hydrocarbon. The water and/or oxygenated hydrocarbons are removed by contacting the olefin stream with an absorbent, wherein the absorbent is selected from the group consisting of a polyol, amine, amide, nitrile, heterocyclic nitrogen containing compound, and mixtures thereof.

Examples of polyol, amine, amide, nitrile, heterocyclic nitrogen containing compounds which can be used include ethylene glycol, diethylene glycol, triethylene glycol, ethanolamine, diethanolamine, triethylamine, hindered cyclic amines, acetonitrile, n-methylpyrrolidone, and dimethyl formamide, as well as mixtures of any two or more of these compounds. Olefins treated in accordance with this invention are particularly suitable for use as feedstock for making polyolefins.

BRIEF DESCRIPTION OF THE DRAWING

One embodiment of invention is shown in the attached FIGURE, which is a flow diagram showing one particular embodiment for removing water and/or oxygenated hydrocarbons from the olefin product of an oxygenate to olefin reaction process.

DETAILED DESCRIPTION OF THE INVENTION

This invention provides a method of removing water and/or oxygenated hydrocarbons from an olefin stream. It is particularly useful for removing water and/or oxygenated hydrocarbons from an olefin product stream of an oxygenate to olefin reaction process. In general, the method comprises contacting an olefin stream with an absorbent selected from the group consisting of a polyol, amine, amide, nitrile, heterocyclic nitrogen containing compound, and mixtures thereof to remove undesirable quantities of water and/or oxygenated hydrocarbon.

In one embodiment of the invention, an olefin stream is obtained by contacting oxygenate with a molecular sieve catalyst. The oxygenate comprises at least one organic compound which contains at least one oxygen atom, such as aliphatic alcohols, ethers, carbonyl compounds (aldehydes, ketones, carboxylic acids, carbonates, esters and the like). When the oxygenate is an alcohol, the alcohol includes an aliphatic moiety having from 1 to 10 carbon atoms, more preferably from 1 to 4 carbon atoms. Representative alcohols include but are not necessarily limited to lower straight and branched chain aliphatic alcohols and their unsaturated counterparts. Examples of suitable oxygenate compounds include, but are not limited to: methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof. Preferred oxygenate compounds are methanol, dimethyl ether, or a mixture thereof.

Molecular sieves capable of converting an oxygenate to an olefin compound include zeolites as well as non-zeolites, and are of the large, medium or small pore type. Small pore molecular sieves are preferred in one embodiment of this invention, however. As defined herein, small pore molecular sieves have a pore size of less than about 5.0 angstroms. Generally, suitable catalysts have a pore size ranging from about 3.5 to about 5.0 angstroms, preferably from about 4.0 to about 5.0 angstroms, and most preferably from about 4.3 to about 5.0 angstroms.

Zeolite materials, both natural and synthetic, have been demonstrated to have catalytic properties for various types of hydrocarbon conversion processes. In addition, zeolite materials have been used as adsorbents, catalyst carriers for various types of hydrocarbon conversion processes, and other applications. Zeolites are complex crystalline aluminosilicates which form a network of $AlO_2^-$ and $SiO_2$ tetrahedra linked by shared oxygen atoms. The negativity of the tetrahedra is balanced by the inclusion of cations such as alkali or alkaline earth metal ions. In the manufacture of some zeolites, non-metallic cations, such as tetramethylammonium (TMA) or tetrapropylammonium (TPA), are present during synthesis. The interstitial spaces or channels formed by the crystalline network enable zeolites to be used as molecular sieves in separation processes, as catalyst for chemical reactions, and as catalyst carriers in a wide variety of hydrocarbon conversion processes.

Zeolites include materials containing silica and optionally alumina, and materials in which the silica and alumina portions have been replaced in whole or in part with other oxides. For example, germanium oxide, tin oxide, and mixtures thereof can replace the silica portion. Boron oxide, iron oxide, gallium oxide, indium oxide, and mixtures thereof can replace the alumina portion. Unless otherwise specified, the terms "zeolite" and "zeolite material" as used herein, shall mean not only materials containing silicon atoms and, optionally, aluminum atoms in the crystalline lattice structure thereof, but also materials which contain suitable replacement atoms for such silicon and aluminum atoms.

One type of olefin forming catalyst capable of producing large quantities of ethylene and propylene is a silicoaluminophosphate (SAPO) molecular sieve. Silicoaluminophosphate molecular sieves are generally classified as being microporous materials having 8, 10, or 12 membered ring structures. These ring structures can have an average pore size ranging from about 3.5 to about 15 angstroms. Preferred are the small pore SAPO molecular sieves having an average pore size of less than about 5 angstroms, preferably an average pore size ranging from about 3.5 to about 5 angstroms, more preferably from about 3.5 to about 4.2 angstroms. These pore sizes are typical of molecular sieves having 8 membered rings.

According to one embodiment, substituted SAPOs can also be used in oxygenate to olefin reaction processes. These compounds are generally known as MeAPSOs or metal-containing silicoaluminophosphates. The metal can be alkali metal ions (Group IA), alkaline earth metal ions (Group IIA), rare earth ions (Group IIIB, including the lanthanoid elements: lanthanum, cerium, praseodymium, neodymium, samarium, europium, gadolinium, terbium, dysprosium, holmium, erbium, thulium, ytterbium and lutetium; and scandium or yttrium) and the additional transition cations of Groups IVB, VB, VIB, VIIB, VIIIB, and IB.

Preferably, the Me represents atoms such as Zn, Mg, Mn, Co, Ni, Ga, Fe, Ti, Zr, Ge, Sn, and Cr. These atoms can be inserted into the tetrahedral framework through a $[MeO_2]$ tetrahedral unit. The $[MeO_2]$ tetrahedral unit carries a net electric charge depending on the valence state of the metal substituent. When the metal component has a valence state of +2, +3, +4, +5, or +6, the net electric charge is between −2 and +2. Incorporation of the metal component is typically accomplished adding the metal component during synthesis of the molecular sieve. However, post-synthesis ion exchange can also be used. In post synthesis exchange, the metal component will introduce cations into ion-exchange positions at an open surface of the molecular sieve, not into the framework itself.

Suitable silicoaluminophosphate molecular sieves include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

An aluminophosphate (ALPO) molecular sieve can also be included in the catalyst composition. Aluminophosphate molecular sieves are crystalline microporous oxides which can have an AlPO$_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. A more detailed description of the background and synthesis of aluminophosphates is found in U.S. Pat. No. 4,310,440, which is incorporated herein by reference in its entirety. Preferred ALPO structures are ALPO-5, ALPO-11, ALPO-18, ALPO-31, ALPO-34, ALPO-36, ALPO-37, and ALPO-46.

The ALPOs can also include a metal substituent in its framework. Preferably, the metal is selected from the group consisting of magnesium, manganese, zinc, cobalt, and mixtures thereof. These materials preferably exhibit adsorption, ion-exchange and/or catalytic properties similar to aluminosilicate, aluminophosphate and silica aluminophosphate molecular sieve compositions. Members of this class and their preparation are described in U.S. Pat. No. 4,567,029, incorporated herein by reference in its entirety.

The metal containing ALPOs have a three-dimensional microporous crystal framework structure of MO$_2$, AlO$_2$ and PO$_2$ tetrahedral units. These as manufactured structures (which contain template prior to calcination) can be represented by empirical chemical composition, on an anhydrous basis, as:

mR: $(M_xAl_yP_z)O_2$ wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved, "x", "y", and "z" represent the mole fractions of the metal "M", (i.e. magnesium, manganese, zinc and cobalt), aluminum and phosphorus, respectively, present as tetrahedral oxides.

The metal containing ALPOs are sometimes referred to by the acronym as MeAPO. Also in those cases where the metal "Me" in the composition is magnesium, the acronym MAPO is applied to the composition. Similarly ZAPO, MNAPO and CoAPO are applied to the compositions which contain zinc, manganese and cobalt respectively. To identify the various structural species which make up each of the subgeneric classes MAPO, ZAPO, CoAPO and MNAPO, each species is assigned a number and is identified, for example, as ZAPO-5, MAPO-11, CoAPO-34 and so forth.

The silicoaluminophosphate molecular sieve is typically admixed (i.e., blended) with other materials. When blended, the resulting composition is typically referred to as a SAPO catalyst, with the catalyst comprising the SAPO molecular sieve.

Materials which can be blended with the molecular sieve can be various inert or catalytically active materials, or various binder materials. These materials include compositions such as kaolin and other clays, various forms of rare earth metals, metal oxides, other non-zeolite catalyst components, zeolite catalyst components, alumina or alumina sol, titania, zirconia, magnesia, thoria, beryllia, quartz, silica or silica or silica sol, and mixtures thereof. These components are also effective in reducing, inter alia, overall catalyst cost, acting as a thermal sink to assist in heat shielding the catalyst during regeneration, densifying the catalyst and increasing catalyst strength. It is particularly desirable that the inert materials that are used in the catalyst to act as a thermal sink have a heat capacity of from about 0.05 to about 1 cal/g-° C., more preferably from about 0.1 to about 0.8 cal/g° C., most preferably from about 0.1 to about 0.5 cal/g-° C.

Additional molecular sieve materials can be included as a part of the SAPO catalyst composition or they can be used as separate molecular sieve catalysts in admixture with the SAPO catalyst if desired. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof. These small and medium pore molecular sieves are described in greater detail in the *Atlas of Zeolite Structural Types*, W. M. Meier and D. H. Olsen, Butterworth Heineman, 3rd ed., 1997, the detailed description of which is explicitly incorporated herein by reference. Preferred molecular sieves which can be combined with a silicoaluminophosphate catalyst include ZSM-5, ZSM-34, erionite, and chabazite.

The catalyst composition, according to an embodiment, preferably comprises from about 1% to about 99%, more preferably from about 5% to about 90%, and most preferably from about 10% to about 80%, by weight of molecular sieve. It is also preferred that the catalyst composition have a particle size of from about 20 angstroms to about 3,000 angstroms, more preferably from about 30 angstroms to about 200 angstroms, most preferably from about 50 angstroms to about 150 angstroms.

The catalyst can be subjected to a variety of treatments to achieve the desired physical and chemical characteristics. Such treatments include, but are not necessarily limited to hydrothermal treatment, calcination, acid treatment, base treatment, milling, ball milling, grinding, spray drying, and combinations thereof.

A molecular sieve catalyst particularly useful in making ethylene and propylene is a catalyst which contains a combination of SAPO-34, and SAPO-18 or ALPO-18 molecular sieve. In a particular embodiment, the molecular sieve is a crystalline intergrowth of SAPO-34, and SAPO-18 or ALPO-18.

To convert oxygenate to olefin, conventional reactor systems can be used, including fixed bed, fluid bed or moving bed systems. Preferred reactors of one embodiment are co-current riser reactors and short contact time, countercurrent free-fall reactors. Desirably, the reactor is one in which an oxygenate feedstock can be contacted with a molecular sieve catalyst at a weight hourly space velocity (WHSV) of at least about 1 hr$^{-1}$, preferably in the range of from about 1 hr$^{-1}$ to 1000 hr$^{-1}$, more preferably in the range of from about 20 hr$^{-1}$ to about 1000 hr$^{-1}$, and most preferably in the range of from about 50 hr$^{-1}$ to about 500 hr$^{-1}$. WHSV is defined herein as the weight of oxygenate, and reactive hydrocarbon which may optionally be in the feed, per hour per weight of the molecular sieve in the reactor. Because the catalyst or the feedstock may contain other materials which act as inerts or diluents, the WHSV is calculated on the weight basis of the oxygenate feed, and any reactive hydrocarbon which may be present with the oxygenate feed, and the molecular sieve contained in the reactor.

Preferably, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions.

The process can generally be carried out at a wide range of temperatures. An effective operating temperature range can be from about 200° C. to about 700° C., preferably from about 300° C. to about 600° C., more preferably from about 350° C. to about 550° C. At the lower end of the temperature range, the formation of the desired olefin products may become markedly slow with a relatively high content of oxygenated olefin by-products being found in the olefin product. However, the selectivity to ethylene and propylene at reduced temperatures may be increased. At the upper end of the temperature range, the process may not form an optimum amount of ethylene and propylene product, but the conversion of oxygenate feed will generally be high.

Operating pressure also may vary over a wide range, including autogenous pressures. Effective pressures include, but are not necessarily limited to, a total pressure of at least 1 psia (7 kPa), preferably at least about 5 psia (34 kPa). The process is particularly effective at higher total pressures, including a total pressure of at least about 20 psia (138 kPa). Preferably, the total pressure is at least about 25 psia (172 kPa), more preferably at least about 30 psia (207 kPa). For practical design purposes it is desirable to use methanol as the primary oxygenate feed component, and operate the reactor at a pressure of not greater than about 500 psia (3445 kPa), preferably not greater than about 400 psia (2756 kPa), most preferably not greater than about 300 psia (2067 kPa).

Undesirably by-products can be avoided by operating at an appropriate gas superficial velocity. As the gas superficial velocity increases the conversion decreases avoiding undesirable by-products. As used herein, the term, "gas superficial velocity" is defined as the combined volumetric flow rate of vaporized feedstock, which includes diluent when present in the feedstock, as well as conversion products, divided by the cross-sectional area of the reaction zone. Because the oxygenate is converted to a product having significant quantities of ethylene and propylene while flowing through the reaction zone, the gas superficial velocity may vary at different locations within the reaction zone. The degree of variation depends on the total number of moles of gas present and the cross section of a particular location in the reaction zone, temperature, pressure and other relevant reaction parameters.

In one embodiment, the gas superficial velocity is maintained at a rate of greater than 1 meter per second (m/s) at least one point in the reaction zone. In another embodiment, it is desirable that the gas superficial velocity is greater than about 2 m/s at least one point in the reaction zone. More desirably, the gas superficial velocity is greater than about 2.5 m/s at least one point in the reaction zone. Even more desirably, the gas superficial velocity is greater than about 4 m/s at least one point in the reaction zone. Most desirably, the gas superficial velocity is greater than about 8 m/s at least one point in the reaction zone.

According to yet another embodiment of the invention, the gas superficial velocity is maintained relatively constant in the reaction zone such that the gas superficial velocity is maintained at a rate greater than 1 m/s at all points in the reaction zone. It is also desirable that the gas superficial velocity be greater than about 2 m/s at all points in the reaction zone. More desirably, the gas superficial velocity is greater than about 2.5 m/s at all points in the reaction zone. Even more desirably, the gas superficial velocity is greater than about 4 m/s at all points in the reaction zone. Most desirably, the gas superficial velocity is greater than about 8 m/s at all points in the reaction zone.

The amount of ethylene and propylene produced in the oxygenate to olefin process can be increased by reducing the conversion of the oxygenates in the oxygenate to olefins reaction. This is because a high conversion of feed oxygenates tends to form additional undesirable non-olefin by-products. However, reducing the conversion of feed oxygenates in the oxygenate conversion reaction tends to increase the amount of oxygenated hydrocarbons that are present in the olefin product. Thus, control of the conversion of feed to the oxygenate reaction process can be important.

According to one embodiment, the conversion of the primary oxygenate, e.g., methanol, is from 90 wt % to 98 wt %. According to another embodiment the conversion of methanol is from 92 wt % to 98 wt %, preferably from 94 wt % to 98 wt %.

According to another embodiment, the conversion of methanol is above 98 wt % to less than 100 wt %. According to another embodiment, the conversion of methanol is from 98.1 wt % to less than 100 wt %; preferably from 98.2 wt % to 99.8 wt %. According to another embodiment, the conversion of methanol is from 98.2 wt % to less than 99.5 wt %; preferably from 98.2 wt % to 99 wt %.

In this invention, weight percent conversion is calculated on a water free basis unless otherwise specified. Weight percent conversion on a water free basis is calculated as: 100×(weight oxygenate fed on a water free basis−weight oxygenated hydrocarbon in the product on a water free basis). The water free basis of oxygenate is calculated by subtracting out the water portion of the oxygenate in the feed and product, and excluding water formed in the product. For example, the weight flow rate of methanol on an oxygenate free basis is calculated by multiplying the weight flow rate of methanol by 14/32 to remove the water component of the methanol. As another example, the rate flow rate of dimethylether on an oxygenate free basis is calculated by multiplying the weight flow rate of diemethylether by 40/46 to remove the water component of the dimethylether. If there is a mixture of oxygenates in the feed or product, trace oxygenates are not included. When methanol and/or dimethylether is used as the feed, only methanol and dimethylether are used to calculate conversion on a water free basis.

In this invention, selectivity is also calculated on a water free basis unless otherwise specified. Selectivity is calculated as: 100×wt % component/(100 wt % water−wt % methanol−wt % dimethylether) when methanol and/or dimethylether is used as the feed.

Desirably, the amount of oxygenated hydrocarbon present in the olefin stream from the oxygenate to olefin reaction, on a water free basis, is at least about 100 ppm by weight, preferably at least about 500 ppm by weight, and more preferably at least about 1000 ppm by weight. The amount of oxygenated hydrocarbon in the olefin stream, on a water free basis, should not be so high, however, to significantly affect removal of the oxygenated hydrocarbon from the desirable olefin product. Preferably, the amount of oxygenated hydrocarbon in the olefin stream from the oxygenate to olefin reaction process, on a water free basis, should be not greater than about 2 wt %, more preferably not greater than about 1 wt %, and most preferably not greater than about 0.5 wt %.

The olefin stream from the oxygenate conversion reaction generally contains a variety of hydrocarbon and non-hydrocarbon components, including water. Typically, the olefin stream will contain at least 40 wt % water and at least 30 wt % hydrocarbons. On a water containing basis, the olefin stream desirably has less than 25 wt % oxygenated hydrocarbons, preferably less than 20 wt %, and more preferably less than 10 wt %. Preferably, on a water containing basis, at least 20 wt % of the olefin stream comprises ethylene and propylene. The ratio of ethylene to propylene can be adjusted as desired by changing catalyst and reactor conditions. Other non-oxygenated hydrocarbons in the product stream can include $C_1$ to $C_7$ paraffins, $C_4$ to $C_7$ olefins, and a variety of other saturated and unsaturated hydrocarbons.

The olefin stream will also contain a variety of oxygenated hydrocarbon components. These components include, for example, methanol, ethanol, $C_3$ alcohols, dimethyl ether, methyl ether, $C_4$ ethers, acetic acid, formic acid, propanoic acid, butyric acid, $C_1$ to $C_6$ aldehydes, and $C_3$ to $C_6$ ketones.

A significant amount of water in the olefin stream from the oxygenate to olefin reaction process is removed by cooling the stream to a temperature below the condensation temperature of the water vapor in the stream. Preferably, the temperature of the product stream is cooled to a temperature below the condensation temperature of the oxygenate feed. In certain embodiments it is desirable to cool the product stream below the condensation temperature of methanol.

It is desirable to cool the olefin stream from the oxygenate to olefin reaction process, then separate the cooled olefin stream into a condensed, water containing stream and an olefin vapor stream. The condensed, water containing stream comprises most of the water from the olefin stream, and a significant portion of the oxygenated hydrocarbons from the olefin stream. The olefin vapor stream comprises a majority of the olefins, e.g., ethylene and propylene.

In one embodiment of the invention, the olefin stream from the oxygenate to olefin reaction process is cooled so that the cooled, condensed water containing stream contains at least 1 wt % oxygenated hydrocarbon, preferably at least about 2 wt % oxygenated hydrocarbon, more preferably at least about 3 wt % oxygenated hydrocarbon. It is also desirable that the cooled, condensed water containing stream contain less than about 1000 ppm by weight olefin components, preferably less than about 500 ppm olefin components, more preferably less than about 250 ppm olefin.

In one aspect of the invention, the olefin stream from the oxygenate to olefin reaction process is cooled so that a vapor stream, rich in olefins, can be separated from the condensed water containing stream. It is desirable that the vapor stream contain not greater than about 20 wt % water, preferably not greater than about 15 wt % water, more preferably not greater than about 12 wt % water.

When the olefin stream is cooled and the olefin vapor stream is separated, the vapor stream desirably contains not greater than about 15 wt % oxygenated hydrocarbon, preferably not greater than about 12 wt % oxygenated hydrocarbon, more preferably not greater than about 10 wt % oxygenated hydrocarbon. In one embodiment, the vapor stream contains not greater than about 15 wt % methanol and dimethylether, preferably not greater than about 12 wt % methanol and dimethylether, and more preferably not greater than about 10 wt % methanol and dimethylether.

In one embodiment of the invention, the olefin stream from the olefin to oxygenate reaction process is cooled at a pressure range that is not substantially greater than that at which the oxygenate to olefin reaction process is carried out. Preferably, the olefin stream is cooled at a pressure of not greater than about 50 psia (345 kPa), more preferably not greater than about 40 psia (276 kPa).

A quench column is one type of equipment that is effective in cooling the olefin stream from the olefin to oxygenate reaction process. In a quench column, a quenching fluid is directly contacted with the olefin stream to cool the stream to the desired condensation temperature. Condensation produces the condensed water containing stream, which is also referred to as a heavy bottoms stream. The olefin portion of the olefin product stream remains a vapor, and exits the quench column as an overhead vapor stream. The overhead vapor stream is rich in olefin product, and can also contain some oxygenated hydrocarbon by-products as well as water.

In one embodiment, the quenching fluid is a recycle stream of the condensed water containing, heavy bottoms stream of the quench column. This water containing stream is desirably cooled, e.g., by a heat exchanger, and injected back into the quench column. It is preferred in this embodiment to not inject cooling medium from an outside source into the quench column, although it may be desirable to do so in other separation equipment down stream of the quench column.

It is also desirable to further separate oxygenated hydrocarbon from the cooled, condensed water containing stream. Conventional separation processes can be used, distillation being one example of a separation process. The separated oxygenated hydrocarbon can then be used as additional feed for the oxygenate reaction or it can be used as fulel or for other processing.

The oxygenated hydrocarbon stream separated from the cooled, condensed water stream should be low in water. In one embodiment the separated oxygenated hydrocarbon stream contains not greater than about 50 wt % water. Lower concentrations of water in the separated stream with concentrations of not greater than about 40 wt %, about 30 wt %, and about 25 wt % being increasingly preferred.

The oxygenated hydrocarbon stream that is separated from the cooled, condensed water containing stream should also contain a relatively high percentage of oxygenated hydrocarbons. Desirably, the separated stream contains at least about 50 wt % of the oxygenated hydrocarbons present in the olefin stream from the oxygenate to olefin reaction process. Higher proportions of oxygenated hydrocarbons extracted from the olefin product stream are preferred. Separated streams containing at least about 60 wt %, at least about 70 wt % and at least about 80 wt % of the oxygenated hydrocarbons present in the olefin stream from the oxygenate reaction process are increasingly preferred.

Another embodiment of this invention provides for additional oxygenated hydrocarbon recovery by compressing the vapor stream formed from cooling the olefin stream from the oxygenate to olefin reaction process. Compressing the vapor stream condenses water and various oxygenated hydrocarbon compounds which were not condensed by merely cooling the olefin stream. These additionally condensed compounds are combined with the condensed water containing stream and the oxygenated hydrocarbon is separated and recovered. Optionally, the compressed condensate stream can be methanol and/or water washed and the oxygenated hydrocarbon separated.

In one embodiment of the invention, the vapor stream is compressed to a pressure that is greater than that at which the oxygenate to olefin reaction process is carried out. Preferably, the vapor stream is compressed to a pressure of at least about 30 psia (207 kPa), more preferably at least about 50 psia (345 kPa), most preferably at least about 100 psia (689 kPa). High pressure ranges are particularly preferred, with the upper limit being a practical one based on cost of design and ease of operation. Practical high pressure limits are generally considered to be up to about 5,000 psia (34,450 kPa), with lower limits of about 1,000 psia (6,895 kPa), about 750 psia (5171 kPa), and about 500 psia (3447 kPa) being increasingly preferred.

Yet another embodiment of this invention provides for the use of caustic wash for removal of oxygenate contaminant. In this embodiment, caustic wash is contacted with the vapor stream to remove carbon dioxide.

In another embodiment of the invention, substantial amounts of water and/or oxygenated hydrocarbon contaminants are removed from the olefin vapor stream by contacting the vapor stream with an effective amount of absorbent. It is preferred that the absorbent be a polyol, amine, amide, nitrile, and/or heterocyclic nitrogen containing compound. This type of absorbent is particularly desirable, since it will remove such hard to remove contaminants as dimethylether and water, yet it will not readily absorb olefin. This means that oxygen contaminants can be removed from the olefin stream with a very high efficiency.

To obtain a high degree of effectiveness, the absorbent material introduced into the absorption system should have little non-oxygenated hydrocarbon absorbing material, such as a diluent. For example, the absorbent material introduced into an absorber should contain at least about 75 wt % absorbent material that is effective in removing dimethylether and/or water from an olefin stream rich in ethylene and/or propylene. Desirably, the absorbent material should contain at least about 90 wt %, preferably at least about 95 wt %, more preferably at least about 98 wt % absorbent. Examples of absorbents include at least one compound selected from the group consisting of ethylene glycol, diethylene glycol, triethylene glycol, ethanolamine, diethanolamine, triethylamine, hindered cyclic amines, acetonitrile, n-methylpyrrolidone, dimethyl formamide, and combinations thereof.

Conventional absorption systems can be used in this invention. In one embodiment, the absorption system uses packed columns, although plate absorption columns may also be used. In another embodiment, the absorption column has a liquid inlet located at a top portion of the absorption column. The absorbent liquid is evenly distributed across the top of the column. Desirably, an even distribution of the absorbent liquid is accomplished by using a distributor plate or spray nozzles. At the bottom of the absorption column is a gas inlet where the olefin, containing water and oxygenated hydrocarbons, enters the absorption column. The vapor components move up the column countercurrent to the liquid absorbent moving down the column. This is known as countercurrent absorption.

The packing or plates in the column provides a surface for intimate contact between the vapor and liquid components within the column. In a countercurrent absorption column, the concentration of soluble gasses in both the liquid and vapor phases is greatest at the bottom of the column, and lowest at the top of the column. The outlet for the vapor is at the bottom of the absorption column, typically below the gas inlet. The outlet for the gas phase lean in the gasses most soluble in the liquid absorbent is at the top of the absorption column, typically above the liquid inlet.

The absorption column can handle changes in the concentration and volume of the oxygenate contaminants fed into the column. The rate that the liquid phase absorbent is fed into the absorption column can be adjusted to respond to disturbances in the system. Sensors in the effluent stream leaving the reactor and/or leaving the quench column can be provided for giving the concentration of water and/or oxygenates in the stream. These "feed-forward" sensors can be used to increase the rate of the liquid absorbent when the flow-rate and/or concentration of water or oxygenates in the effluent stream increases. "Feedback" sensors can also be provided to give the concentration of water and oxygenates leaving the absorption column. If the concentration of the water and/or oxygenates leaving the column is higher than desired, the rate of the liquid absorbent can be increased accordingly. Preferably, feed-forward and feed-back sensors are connected to a computer apparatus that can make the necessary adjustments in the column and diminish changes to the gas stream leaving the column.

The olefin composition leaving the absorption system should have not greater than about 1000 wppm water. Preferably the olefin contains not greater than about 500 wppm water, more preferably not greater than about 100 wppm, and most preferably not greater than about 10 wppm. Preferably at least 25 wt % of the oxygenated hydrocarbons are removed, more preferably at least 50 wt %, and most preferably at least 75 wt %. One or more absorption columns can be used in series or in parallel to decrease the concentration of water and oxygenated hydrocarbons to desired levels, and to handle larger volumes of olefin composition from the oxygenate to olefin process.

Absorbent liquid can be regenerated by conventional means. In one embodiment, the absorbent liquid containing the absorbed gasses is fed into a distillation column and the oxygenated hydrocarbons and water are removed as an overhead product. Regenerated absorbent liquid is removed as a bottoms product. The oxygenated hydrocarbons so removed can be fed back into the oxygenate to olefin reactor as a co-feed to make more hydrocarbon products.

Following the absorption system, the olefin composition can be directed into one or more adsorbent beds for removal of additional water and oxygenates, if desired. It is not necessary, however, that the olefin from the absorption system be fed into the adsorption beds.

Adsorption is a separation process in which certain components of a fluid stream are preferentially transferred to the surface of a solid adsorbent. Typically the adsorption process is carried out in one or more fixed beds containing a suitable solid adsorbent.

Adsorption is useful for removing low concentrations of water and oxygenated hydrocarbons, and for removing oxygenated hydrocarbons that may not normally be removed by using absorption. Preferably, an adsorbent system used as part of this invention has multiple adsorbent beds. Multiple beds allow for continuous separation without the need for shutting down the process to regenerate the solid adsorbent. For example, in a three bed system typically one bed is on-line, one bed is regenerated off-line, and a third bed is on stand-by.

The specific adsorbent solid or solids used in the adsorbent beds depends on the types of contaminants being removed. Examples of solid adsorbents for removing water and various polar organic compounds, such as oxygenated hydrocarbons and absorbent liquids, include aluminas, silica, 3A molecular sieves, 4A molecular sieves, and alumino-silicates. Beds containing mixtures of these sieves or multiple beds having different adsorbent solids can be used to remove water, as well as a variety of oxygenated hydrocarbons In this invention, one or more adsorption beds can be arranged in series or parallel. In one example of a series arrangement, a first bed is used to remove the smallest and most polar molecules which are the easiest to remove. Subsequent beds for removing larger less polar oxygenated species are next in series. As a specific example of one type of arrangement, water is first selectively removed using a 3A molecular sieve. This bed is then followed by one or more beds containing one or more less selective adsorbents such as a larger pore molecular sieve e.g. 13× and/or a high surface area active alumina such as Selexorb CD (Alcoa tradename).

In another embodiment, the first bed is a 3.6A molecular sieve capable of selectively removing both water and methanol. This bed can then be followed by one or more 13× or active alumina beds as described above.

The adsorbent beds can be operated at ambient temperature or at elevated temperature as required, and with either upward or downward flow. Regeneration of the adsorbent materials can be carried out by conventional methods including treatment with a stream of a dry inert gas such as nitrogen at elevated temperature.

Preferably the olefin from the adsorption beds contains less than about 100 wppm water, more preferably less than about 10 wppm, and most preferably less than 1 wppm. Preferably less than about 10 wppm oxygenated hydrocarbons are present in the stream leaving the adsorption beds, more preferably less than about 5 wppm, and most preferably less than about 1 wppm.

An example of one embodiment of the invention is shown in the Figure. A methanol containing feed stream 10 is fed into an oxygenate to olefin reactor 12. The oxygenate to olefin reactor 12 contains a SAPO-34 catalyst that converts the methanol feed stream 12 into an olefin stream 14 which comprises olefin, water, and a variety of oxygenated hydrocarbon compounds.

The olefin stream 14 is directed into a bottom portion of a quench tower 18. A recycle stream 16, containing a substantial quantity of water, is directed into a top portion of the quench tower 18 at a rate sufficient to condense most of the water and unreacted oxygenate feed present in the olefin stream 14. The quench tower 18 contains a packing that aids heat transfer and mixing of olefin stream 14 and the recycle stream 16.

Stream 20, the bottoms from the quench tower 18, contains warmed quenching water, condensed water, absorbed oxygenates and condensed unreacted methanol from olefin stream 14. At least a portion of this stream is used as the recycle stream 16.

Stream 22, the overhead stream from quench tower 18, contains olefin products along with oxygenated hydrocarbons that were not completely condensed in the quench tower 18. Stream 22 is directed to optional compressor 24. Compressor 24 compresses stream 22 to form a compressed olefin stream 26.

Compressed olefin stream 26 is directed to an optional caustic wash tower 30. The caustic wash tower 30 contains a packing that allows for intimate contact between gas and liquid phases within the tower. A caustic solution 28 is directed into the top of the caustic wash tower. The caustic solution travels down the caustic wash tower in intimate contact, with the compressed olefin stream 26 moving up the wash tower. The caustic solution removes carbon dioxide from the compressed olefin stream 26. An olefin containing stream is removed from the caustic wash tower 30 as an overhead stream 34, and a stream containing the caustic wash is removed as a bottoms stream 32.

The caustic treated overhead stream 34 is then directed to the bottom of absorption column 38. Absorption column 38 contains a packing that allows for intimate contact between gas and liquid phases within the tower. An ethylene glycol stream 36 enters at the top of the absorption column and moves down the column. Vapor from the olefin stream 34 moves up the absorption column, countercurrent to the ethylene glycol stream. Water and oxygenated hydrocarbons from the caustic treated overhead stream 34 are absorbed into the ethylene glycol stream 34, forming an ethylene gylcol, water, and oxygenated hydrocarbon containing stream which leaves from the bottom of the column through a line 40. The stream from line 40 goes to further processing to regenerate the ethylene glycol absorbent for reuse as absorbent. An olefin stream 42 leaves the top of absorption column 38.

Olefin stream 42 is then directed to optional fixed adsorption beds 44. Fixed adsorption beds 44 can be more than one bed, with one embodiment being a series arrangement. In this arrangement, a first bed contains 3A molecular sieves. The 3A molecular sieves decrease the concentration of water in the olefin stream. Another adsorption bed which follows contains a larger pore molecular sieve for removing oxygenated hydrocarbons. Olefin product stream 46 is then sent to further processing or for derivative manufacturing. According to this invention, derivative manufacturing refers to the manufacture of polyolefin as well as non-polyolefin materials.

The olefin product produced by the oxygenate to olefin conversion reaction and purified according to this invention can be polymerized to form a plastic composition, e.g., polyolefin, particularly polyethylene and polypropylene. Any conventional process for forming polyolefins from olefins can be used. Catalytic processes are preferred. Particularly preferred are metallocene, Ziegler/Natta, aluminum oxide and acid catalytic systems. See, for example, U.S. Pat. Nos. 3,258,455; 3,305,538; 3,364,190; 5,892,079; 4,659,685; 4,076,698; 3,645,992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

In one embodiment of this invention, the olefin product is contacted with a metallocene catalyst to form a polyolefin. Desirably, the polyolefin forming process is carried out at a temperature ranging between about 50° C. and about 320° C. The reaction can be carried out at low, medium or high pressure, being anywhere within the range of about 1 bar to about 3200 bar. For processes carried out in solution, an inert diluent can be used. In this type of operation, it is desirable that the pressure be at a range of from about 10 bar to about 150 bar, and preferably at a temperature range of from about 120° C. to about 250° C. For gas phase processes, it is preferred that the temperature generally be within a range of about 60° C. to 120° C., and that the operating pressure be from about 5 bar to about 50 bar.

In addition to polyolefins, numerous other olefin derivatives may be formed from the olefins treated according to this invention. The olefins treated according to this invention can also be used in the manufacture of such compounds, for example, as aldehydes, alcohols, acetic acid, linear alpha olefins, vinyl acetate, ethylene dicholoride and vinyl chloride, ethylbenzene, ethylene oxide, cumene, isopropyl alcohol, acrolein, allyl chloride, propylene oxide, acrylic acid, ethylene-propylene rubbers, and acrylonitrile, and trimers and dimers of ethylene, propylene or butylenes.

Having now fully described this invention, it will be appreciated by those skilled in the art that the invention can be performed within a wide range of parameters within what is claimed, without departing from the spirit and scope of the invention.

What is claimed is:

1. A method of removing water and/or oxygenated hydrocarbons from an olefin stream, comprising:
   contacting an oxygenate with an olefin forming catalyst to form an olefin stream, wherein the olefin stream comprises olefin and oxygenated hydrocarbon;
   cooling the olefin stream to form a condensed water containing stream and an olefin vapor stream;
   contacting the olefin vapor stream with caustic wash to remove carbon dioxide; and
   contacting the caustic washed olefin stream with an absorbent in an absorption system to absorb the water and/or oxygenated hydrocarbon from the olefin stream, wherein the absorbent is selected from the group consisting of a polyol, amine, amide, nitrile, heterocyclic nitrogen containing compound, and mixtures thereof.

2. The method of claim 1, further comprising removing an olefin stream from the absorption system.

3. The method of claim 2, wherein the olefin stream removed from the absorption system contains at least 50 wt % less oxygenated hydrocarbon than the olefin stream fanned by contacting the oxygenate with the catalyst.

4. The method of claim 1, wherein the absorbent is selected from the group consisting of ethylene glycol, diethylene glycol, triethylene glycol, ethanolamine, diethanolamine, triethylamine, hindered cyclic amines, acetonitrile, n-methylpyrrolidone, dimethyl formamide, and combinations thereof.

5. The method of claim 1, wherein the absorption system is a countercurrent liquid absorption column.

6. The method of claim 1, further comprising compressing the olefin stream prior to contacting with the absorbent.

7. The method of claim 2, further comprising contacting the olefin stream recovered from the absorption system with an adsorbent to form an olefin product stream.

8. The method of claim 7, further comprising polymerizing olefin in the olefin product stream.

9. The method of claim 7, wherein the olefin product stream contains not greater than 1 wppm water.

10. A method of removing water and/or oxygenated hydrocarbons from an olefin stream, comprising:
    providing an olefin stream containing at least 50 wt % ethylene and propylene, not greater than 20 wt % water, and not greater than 15 wt % oxygenated hydrocarbon;
    cooling the olefin stream to form a condensed water containing stream and an olefin vapor stream;
    contacting the olefin vapor stream with caustic wash to remove carbon dioxide; and
    contacting the caustic washed olefin stream with an absorbent to absorb water and/or oxygenated hydrocarbon from the olefin stream, wherein the absorbent is selected from the group consisting of a polyol, amine, amide, nitrile, heterocyclic nitrogen containing compound, and mixtures thereof.

11. The method of claim 10, wherein the olefin stream contains at least 55 wt % ethylene and propylene.

12. The method of claim 10, wherein the olefin stream contains at least 60 wt % ethylene and propylene.

13. The method of claim 10, wherein the olefin stream contains not greater than 15 wt % water.

14. The method of claim 10, wherein the olefin stream contains not greater than 10 wt % water.

15. The method of claim 10, wherein the olefin stream contains not greater than 12 wt % oxygenated hydrocarbon.

16. The method of claim 10, wherein the olefin stream contains not greater than 10 wt % oxygenated hydrocarbon.

17. The method of claim 10, wherein the absorbent is selected from the group consisting of ethylene glycol, diethylene glycol, triethylene glycol, ethanolamine, diethanolamine, triethylamine, hindered cyclic amines, acetonitrile, n-methylpyrrolidone, dimethyl formamide, and combinations thereof.

18. The method of claim 10, further comprising recovering olefin from the absorbed vapor stream and polymerizing the olefin.

19. A method of removing water and/or oxygenated hydrocarbons from an olefin stream, comprising:
    providing an olefin vapor stream, wherein the olefin vapor stream comprises olefin, water and oxygenated hydrocarbon;
    cooling the olefin stream to form a condensed water containing stream and an olefin vapor stream;
    contacting the olefin vapor stream with caustic wash to remove carbon dioxide; and contacting the caustic washed olefin vapor stream with an absorbent in an absorption system to absorb the oxygenated hydrocarbon and/or water from the olefin vapor stream, wherein the absorbent is selected from the group consisting of a polyol, amino, amide, nitrile, heterocyclic nitrogen containing compound, and mixtures thereof.

20. The method of claim 19, further comprising removing an olefin stream from the absorption system.

21. The method of claim 20, wherein the olefin stream removed from the absorption system contains not greater than 1000 wppm water.

22. The method of claim 20, wherein the olefin stream removed from the absorption system contains at least 50 wt % less oxygenated hydrocarbon and water than the provided olefin vapor stream.

23. The method of claim 19, wherein the absorbent is selected from the group consisting of ethylene glycol, diethylene glycol, triethylene glycol, ethanolamine, diethanolamine, triethylamine, hindered cyclic amines, acetonitrile, n-methylpyrrolidone, dimethyl formamide, and combinations thereof.

24. The method of claim 19, wherein the absorption system is a countercurrent liquid absorption column.

25. The method of claim 19, further comprising compressing the provided olefin vapor stream prior to contacting with the absorbent.

26. The method of claim 20, further comprising contacting the olefin stream removed from the absorption system with an adsorbent to form an olefin product stream.

27. The method of claim 26, further comprising polymerizing olefin in the olefin product stream.

28. The method of claim 26, wherein the olefin product stream contains not greater than 1 wppm water.

29. A method of removing water from an olefin stream, comprising:
    contacting an oxygenate with an olefin forming catalyst to form an olefin stream, wherein the olfin stream comprises olefin and water;
    cooling the olefin stream to form a condensed water containing stream and an olefin vapor stream;
    contacting the olefin vapor stream with caustic wash to remove carbon dioxide; and
    contacting the caustic washed olefin stream with an absorbent in an absorption system to absorb the water from the olefin stream, wherein the absorbent is selected from the group consisting of a polyol, amine, amide, nitrile, heterocyclic nitrogen containing compound, and mixtures thereof.

30. The method of claim 29, further comprising removing an olefin stream from the absorption system.

31. The method of claim 30, wherein the olefin stream removed from the absorption system contains at least 50 wt % less water than the olefin stream formed by contacting the oxygenate with the catalyst.

32. The method of claim 29, wherein the absorbent is selected from the group consisting of ethylene glycol, diethylene glycol, triethylene glycol, ethanolamine, diethanolamine, triethylamine, hindered cyclic amines, acetonitrile, n-methylpyrrolidone, dimethyl formamide, and combinations thereof.

* * * * *